United States Patent [19]

Austin

[11] Patent Number: 4,574,150

[45] Date of Patent: Mar. 4, 1986

[54] DRY FREE-FLOWING WATER-SOLUBLE COMPLEXES OF CHITOSAN

[75] Inventor: Paul R. Austin, Wilmington, Del.

[73] Assignee: University of Delaware, Newark, Del.

[21] Appl. No.: 703,070

[22] Filed: Feb. 19, 1985

[51] Int. Cl.⁴ .............................................. C08B 37/08
[52] U.S. Cl. ....................................... 536/20; 536/119
[58] Field of Search .......................................... 536/20

[56] References Cited

U.S. PATENT DOCUMENTS

| | | | |
|---|---|---|---|
| 2,040,879 | 5/1936 | Rigby | 260/54 |
| 2,040,880 | 5/1936 | Rigby | 13/54 |
| 2,201,762 | 5/1940 | Cupery | 260/45 |
| 3,879,376 | 4/1975 | Vanlerberghe et al. | 536/20 |
| 3,953,608 | 4/1976 | Vanlerberghe et al. | 536/20 |
| 4,134,412 | 1/1979 | Gross et al. | 536/20 |
| 4,223,023 | 9/1980 | Furda | 536/20 |

OTHER PUBLICATIONS

Sugano et al., Am. J. Clinical Nutrition 33 787 (1980).
Hayes et al., 1978; Mass. Inst. Tech. Office of Sea Grant, U.S. Department of Commerce, Report MITSG 78-7, pp. 103–106.

Primary Examiner—Johnnie R. Brown
Attorney, Agent, or Firm—Dean R. Rexford

[57] ABSTRACT

A process for preparing dry, free-flowing chitosan-carboxylic acid complexes is taught wherein chitosan, containing free amino groups is dispersed in selected liquids and contacted with selected carboxylic acids. The complexes are recovered by filtration, decantation or centrifugation.

8 Claims, No Drawings

DRY FREE-FLOWING WATER-SOLUBLE COMPLEXES OF CHITOSAN

The Government of the United States of America has rights in this invention pursuant to Grant No. NA8-3AA-D-00017 awarded by the U.S. Department of Commerce.

BACKGROUND AND PRIOR ART

This invention pertains to dry, free-flowing water-soluble chitosan-carboxylic acid complexes and a method for preparing them.

Chitosan, a deacetylated chitin, is a cation-active poly-primary amine with diverse applications in fields such as dispersing agents, adhesives, pesticides, waste water treatment, food processing, and wound healing. Chemically, chitosan is predominantly poly-1,4-(2-amino-2-deoxyglucose). Normally it is prepared from chitin by alkaline hydrolysis and is sufficiently deacetylated to become soluble in 1–4% acetic or formic acid. The parent chitin isolate is derived, for example, from crustacean shells by decalcification and deproteinization with acid and alkali, as appropriate.

Rigby patents, U.S. Pat. Nos. 2,040,879 and 2,040,880 (1936), are the classic references to the preparation of chitosan and list no fewer than 70 aqueous salt solutions thereof. A more recent reference describes chitosan salt solutions prepared similarly by dissolving chitosan in two molar aqueous solutions of carboxylic acids (Hayes et al. 1978; Mass. Inst. Tech., Office of Sea Grant, U.S. Department of Commerce, report MITSG 78-7, p. 103).

The art teaches the preparation by precipitation of dry water-soluble chitosan salts of inorganic acids. For example, Cupery in U.S. Pat. No. 2,201,762 teaches the precipitation of the sulfamic acid salt from an aqueous solution with methanol. Similarly, Sugano et al. in Am. J. Clinical Nutrition, 33, 787 (1980) teach the precipitation of the hydrochloride from an aqueous solution by the addition of acetone.

The art does not teach the preparation of dry, free-flowing, water-soluble normal and iso-monocarboxylic acid salts of chitosan. Cupery supra states the problem in using aqueous solutions as follows:

"attempts to prepare . . . the solid acetic acid derivative of . . . deacetylated chitin were not successful. A gel-like mass formed upon addition of the reaction mixture (a solution of about 4% chitosan in 4% aqueous acetic acid) to methanol."

As set out in Example 8, the technique of Sugano et al. which precipitated filterable chitosan hydrochloride by addition of acetone to its aqueous solution, failed when applied to organic acid salts of chitosan such as the salts of formic, glycolic, and lactic acid. The propionic acid salt was filterable but the product, on drying at room temperature, was water-insoluble, horny, and nonfree-flowing.

For pharmaceutical and nutritional purposes, for example, carboxylic acid salts are often preferred over inorganic acid salts such as the chloride.

SUMMARY OF THE INVENTION

A process for preparing a dry, free-flowing, water-soluble carboxylic acid complex of chitosan comprising the steps of
(A) combining to form a mixture;
  (1) one part by weight of particulate chitosan in which at least about 70% of all acetamido groups are deacetylated;
  (2) one-half to about 30 parts by weight of a liquid selected from the group consisting of alkanes containing about five to about nine carbon atoms, monoketones, monoesters, mono- and di-ethers, mononitriles, and mononitroalkanes containing two to four carbon atoms, and normally liquid mono-, poly-chloroalkanes, and alkenes containing one to two carbon atoms; and
  (3) from about 0.1 to about 30 equivalents of a saturated normal or iso-monocarboxylic acid for each amino group equivalent in said chitosan, said carboxylic acid containing one to four carbon atoms and from zero to one of the groups (a), (b), (c) consisting of:
    (a) one to two chlorine atoms;
    (b) one keto group;
    (c) one hydroxyl group;
  (4) from zero to about 30 perecent by weight of water based on the weight of the carboxylic acid;
(B) maintaining said mixture until said chitosan is rendered water-soluble; and
(C) recovering and drying water-soluble carboxylic acid complex of chitosan at a temperature below the denaturation temperature.

Preferred embodiments comprise:
(A) Combining to form a mixture:
  (1) one part by weight of particulate chitosan in which at least about 70% of all acetamido groups are deacetylated;
  (2) from one-half part to about 30 parts by weight of a liquid selected from the group consisting of heptane, acetone, 2-butanone, ethyl formate, ethyl acetate, methylene chlorine, 1,2-dichloroethane, 1,1,2-trichloroethane, trichloroethylene, perchloroethylene, 1,4-dioxane, acetonitrile, tetrahydrofurane, nitroethane, and 2-nitropropane;
  (3) from one-tenth to about 30 equivalents for each equivalent of free amino group in said chitosan, of a carboxylic acid selected from the group consisting of formic, acetic, propionic, butyric, isobutyric, pyruvic, glycolic, lactic, monochloroacetic, and dichloroacetic acid; and
  (4) from zero to about 30 percent by weight of water, calculated on the weight of carboxylic acid; and thereafter
(B) maintaining said mixture until said chitosan is rendered water soluble; and
(C) recovering and drying said salt at a temperature below the denaturation temperature.

DESCRIPTION OF THE PREFERRED EMBODIMENTS

It has been found that particulate chitosan dispersed in selected liquids, reacts with selected carboxylic acids containing up to and including four carbon atoms, to form easily dried, free-flowing, water-soluble carboxylic acid complexes easily recovered by, for example, decantation, centrifuging, of filtering.

As used herein, the term "free flowing" as applied to the product of the invention process, means that the product is particulate and that it can be poured, for example from one container to another; the product flows in the sense that sand flows from the upper globe of an hour glass to the lower globe.

It has also been found that chitosan, on treatment with certain of the disclosed carboxylic acids, notable formic, acetic, and pyruvic acids, not only undergoes the acid-base reaction with salt formation but also at the same time takes up these acids in amounts greater than stoichiometric, possibly by intercalation. The acids so taken up are strongly held and are not washed out by the liquids taught herein as reaction media. It has also been found that products containing substantially less than the a stoichiometric amount of carboxylic acid as taught are surprisingly water soluble.

As the behavior of acids not yet tested cannot be predicted in advance, the work "complex" is used herein to mean all products resulting from the treatment of chitosan with carboxylic acid according to this invention, whether the product contains more or less than the stoichiometric amount of acid. All such combinations falling within this definition share the invention advantages, i.e., they are recovered in dry, free-flowing and water-soluble form.

The process of the invention is carried out in a heterogeneous reaction system. As is well known, heterogeneous reactions which include polymeric solid phases as in the instant case, are difficult to control since reaction with the solid phase depends not only on particle size, but also on the crystallinity and the intra- and intermolecular hydrogen bonding of the phase as they affect the accessibility to the reactant of the active reactive centers, in this case, the free amino groups of chitosan. The invention mixture comprises three components, the solid phase chitosan, a selected liquid phase and a lower molecular weight carboxylic acid as defined which must distribute itself appropriately between the solid and the liquid phase.

Other factors may affect the reaction of the carboxylic acid with chitosan, such as the dissociation and dielectric constants of the acid, the Hildebrand solubility parameters of the polymer and total liquid medium, and possibly even the spacial conformation of the chitosan molecules as related to the molecular size of the carboxylic acids.

Although the details of the process and the specific interactions of the above factors are not known, it has now been found that the simple normal- and iso-acids and hydroxy-, chloro-, or keto-acids containing one through four carbon atoms, including mixtures thereof are operable. Examples of operable acids are formic, acetic, propionic, butyric, isobutyric, glycolic, lactic, pyruvic, and chloro- and dichloroacetic acids. Of these, formic, acetic, propionic, lactic, and glycolic acids are preferred because of the ease of their preparation and recovery of the complexes.

Some of the complexes of the invention lose acid and become insoluble on extended open storage by a process not entirely understood but perhaps because of a finite vapor pressure of the acid over the complex. As set out above, three acids, formic, acetic, and pyruvic, form complexes containing more than the stoichiometric amount of acid which nevertheless appear to be relatively stable, particularly if confined, for example, in a closed container. The chitosan complex with more than a stoichiometric amount of pyruvic acid appears to be indefinitely stable. Because of easier preparation and greater stability, the formic acid complex with chitosan is preferred over the acetic acid complex.

Special advantage is seen in products containing greater than stoichiometric amounts of acid, for example, in the formulation of various product mixtures as well as in storage life.

Invention products containing less than the stoichiometric amount of acid are also soluble in water. They are obtainable by allowing acid to evaporate over long periods of time from products having larger amounts of acid, or by employing less acid in their preparation. Even those products containing only about 20% of the stoichiometric amount of acid may be soluble in water. The solubility property is a prime criterion of products falling within the invention.

The invention process employs well known process steps readily understood by the skilled artisan. The order of addition of reactants is not critical. However, it is often preferred to employ the general order of steps following:

(1) Dispersing particulate chitosan in a selected liquid or mixture of liquids;
(2) Adding to the dispersion a selected carboxylic acid, neat or in mixture with a liquid of (1);
(3) Allowing the carboxylic acid to act on said chitosan in dispersion to form a chitosan-carboxylic acid complex;
(4) Recovering and drying said salt at a temperature below the denaturation temperature.

Within the broad outlines set out above, the steps of the process are carried out in detail as follows:

(1) Preparation of the Dispersion

Chitosan is available commercially in a range of molecular weights. It is commonly found to be deacetylated to yield free amino groups to the extent of 75 to 90%. Such chitosans are suitable as starting materials in the instant invention.

The chitosan is employed in particulate form, achieved normally by grinding, e.g., to 8 to about 40 mesh (2.38 to 0.373 mm, International, I.S.O. Standard). The rate of the reaction between the chitosan and the carboxylic acid in the next step depends in part on the fineness of the particles. The particulate chitosan is preferably dispersed, normally with stirring, in about one-half to about 30 parts by weight of a liquid selected from the group consisting of acetone, 2-butanone, ethyl formate, ethyl acetate, methylene chloride, 1,2-dichloroethane, 1,1,2-trichloroethane, trichloroethylene, perchloroethylene, 1,4-dioxane, acetonitrile, tetrahydrofuran, nitroethane, and 2-nitropropane.

All liquids taught are operable. Selection will normally be made on the basis of cost, availability, toxicity, ease of drying the product and similar considerations. As explained below, ethyl acetate, as the artisan will find, is preferable for use with water-containing lactic acid and 1,2-dichloroethane functions well with formic acid containing 3 to 5% water. Liquids and acids may be mixed, for example, to adjust the specific gravity of the mixture.

(2) Selection and Addition of Carboxylic Acid

As with the choice of liquid, selection of the carboxylic acid will be made, at least in part, on the basis of cost, availability, toxicity, and similar considerations. In food and pharmaceutical applications as set out above, the organic acid complexes of the invention are generally preferred over, for example, the hydrochloride of the art. For reasons pertaining to storage stability of the product complex as will be demonstrated in examples, formic acid and pyruvic acid are preferred, and formic acid is most preferred.

As set out supra, formic acid, acetic acid, and pyruvic acid form complexes containing more than the stoichiometric amount of acid, possibly by a process of intercalation. Complexes are believed to be formed with these acids at the same time the salt-forming reaction is going on. The excess of acid over the stoichiometric amount may have advantage in some applications. For example, excess formic acid is preferred in the case of the formic acid complex, which when confined in a closed container, remains water soluble for long periods, at least nine months.

The carboxylic acid may be added to the reaction mixture either neat or in solution and may be added portionwise or all at once. The artisan may find it useful in some cases to add a small amount of water to provide a dissociation medium.

It may be noted that commercial formic, glycolic, and lactic acids normally contain 3–30% of water for stabilization or avoidance of their decomposition on distillation. Such acids are considered concentrated, but may require special techniques for their best use. Thus 95–97% formic acid may be used with 1,2-dichloroethane as the reaction medium, but with 85% lactic acid, ethyl acetate or other media that dissolve both water and lactic acid are preferred for carrying out the reaction. In such cases azeotropes of the liquid and water aid in the evaporative removal of the liquid and possibly in the reaction itself. In the preparation of chitosan complexes containing more than the stoichiometric amount, use of the concentrated acid is preferred.

For acids containing large amount of water, e.g., 85% lactic acid or 70% glycolic acid, it may be desirable first to extract the acid into the reaction liquid and utilize the liquid extract for reaction with chitosan.

The terms "normal or iso-" are employed in claims so as to comprise, for example, normal and iso-butyric acid.

(3) Reaction to Form Chitosan-Carboxylic Acid Complex

The rate of the complex formation varies, being moderated by the heterogeneous nature of the mixture, as discussed supra. The reaction is allowed to continue until a sample removed from the mixture is found to be soluble in water. Usually no more than two to three hours time is sufficient. It is preferred to stir the mixture during reaction but this is not absolutely necessary. Occasional shaking is often sufficient.

The reaction is conveniently carried out at room temperature, say 20°–25° C., although reaction is satisfactory over the range from about 0° C. to about 60° C. Reaction time may be adjusted for slower reaction at the lower temperatures.

(4) Recovering and Drying the Complex

An important feature of the instant invention pertains to the ready recovery of the product. The complex, prepared according to the disclosed procedures, is readily recovered by art methods for separating solids from liquids, such as filtering, centrifuging, and decanting. The product is normally washed several times ordinarily, with fresh liquid in which it was prepared. As set out above, greater than stoichiometric amounts of formic, acetic, and pyruvic acids are not washed out of the product; other acids studied are.

It is preferred to allow the wet product to dry in air, although a 40° C. oven is sometimes helpful. Depending on the liquid employed, about two hours is normally adequate.

Drying at high temperature, e.g., above about 60° C., may denature the product and make it at least, in part, water-insoluble.

The practice of this invention is further illustrated, though not limited, by the following specific examples.

EXAMPLE 1

Employment of Various Acids in Various Liquids

This example, within the invention, illustrates a broad range of acids and liquids that can be employed in the practice of this invention. For these tests, the chitosan employed was a low viscosity, commercial product with about 80% of the original acetamido groups hydrolyzed to amino groups, such that the estimated equivalent weight is 169. One-half gram ($3 \times 10^{-3}$ equiv.) of 40 mesh (0.373 mm) derived from brown shrimp (*Penaeus aztecus*) from the Gulf of Mexico was employed in each case. It was dried over phosphorus pentoxide. It had a bulk density of 0.41 g/ml and a sp. gr. of 1.44. The viscosity of a 1% solution in 1% formic acid was 14.4 centipoises, and the pH of the solution was 2.8. As noted in the table below, a variety of reaction liquids of the classes of hydrocarbons, chlorohydrocarbons, ethers, esters, nitriles, and ketones are demonstrated. All of the products were dry, free-flowing, and soluble in water.

| | Chitosan Carboxylic Acid Complexes Formed in Various Liquids | | | | | |
|---|---|---|---|---|---|---|
| Acid | Vol. (ml) | Reaction Medium | Vol. (ml) | Yield g | % | Water Sol.[1] |
| Formic, 88% | 1.5 | Tetrahydrofuran | 10 | .63 | 98 | ++ |
| Formic, 95–97% | 1 | Ethyl acetate | 10 | .65 | 102 | +++ |
| Formic, 95–97% | 1 | Heptane | 10 | .63 | 98 | + |
| Formic, 88%[2] | NA | Acetone | 1 | NA | NA | + |
| Acetic (glacial) | 1 | 1,2-Dicholoroethane | 5 | .69 | 101 | ++ |
| Acetic (glacial) | 1 | Acetonitrile | 5 | .65 | 96 | ++ |
| Acetic (glacial) | 1 | Ethyl acetate | 5 | .57 | 84 | + |
| Propionic | 1 | 5% water in acetonitrile | 5 | .54 | 75 | + |
| Isobutyric[2] | 2 | Acetonitrile | 4 | .58 | 77 | + |
| Chloroacetic | 1 | 1,2-Dichloroethane | 5 | .68 | 87 | + |
| Dichloacetic | 1 | 1,2-Dichloroethane | 5 | .75 | 84 | + |

[1]Rate of solution, + = slow; +++ = rapid
[2]High viscosity chitosan

EXAMPLE 2

Chitosan-Formic Acid Complex

Twenty-five g (0.15 equiv.) of low viscosity chitosan as described in Example 1 was dispersed in 300 ml of 1,2-dichloroethane at about 15° C. To this mixture there was added 25 ml of 95–97% formic acid, a few ml at a time over a 30-minute period, during which time the temperature rose to 22° C. After stirring for two hours at ambient temperature, the mixture was filtered with suction and washed several times on the filter with 1,2-dichloroethane.

A small portion of the washed chitosan-formic acid complex was removed to the bench top and weighed periodically to observe its weight loss with time. The results were as follows:

| Time (min) | Weight (g) |
| --- | --- |
| 0 | .65 |
| 7 | .56 |
| 12 | .55 |
| 20 | .54 |
| 25 | .525 |
| 90 | .51 |
| 4 days | .42 |

It is seen that there is very rapid loss during the first seven minutes when the superficial reaction liquid evaporates; thereafter the loss, undoubtedly of formic acid, is very slow, indicative of a chitosan formate-formic acid complex wherein the adsorbed acid is held very tenaciously. Thus, there are two rates, one for loss of superficial reaction liquid and one for loss of formic acid from the complex. The data suggest that the liquid-free chitosan complex weighed 0.53 g. After four days, the product, presumably comprising the stoichiometric amount of formic acid, weighed 0.42 g with 0.11 g corresponding to above-stoichiometric formic acid.

Since the fully dried chitosan product weighed 0.42 g equivalent to 0.0025 mole (0.42/(169+46) and the total formic acid amounted to 0.0024 (0.11÷46) moles, there was slightly more than one molar excess of formic acid present in the original chitosan complex.

The bulk of the chitosan complex was placed in a glass tray in a fume hood to dry. After four days the odor of formic acid was still strong. The formic acid in the complex is given by the difference in weight between starting chitosan and chitosan complex. This was found to be 8.8 g or 0.19 mole. As there were 0.15 moles of starting chitosan, it follows that each mole of chitosan is complexed with 1.27 moles of formic acid at this stage of the experiment.

After another three days, the chitosan was odor free. It was freely soluble in water, had a bulk density of 0.33 g/ml, a sp. gr. of about 1.44 and the pH of a 1% solution in water was 5.0. The readily formed water solution showed the absence of Cl$^-$ ion (AgNO$_3$ test). The viscosity of the solution was 11.6 cp (Brookfield, corr.) Its specific rotation $[\alpha]_D$, was 5.0° (in water).

EXAMPLE 3

Formic Acid Complex, Coarse Chitosan

This example demonstrates a preparation similar to that of Example 2 using coarsely ground chitosan.

Ten g of chitosan (0.059 equiv.) was dispersed in 200 ml of 1,2-dichloroethane with magnetic stirring and 10 ml of 95–97% formic acid was added; the stirring was continued at room temperature for three hours. The chitosan was derived from Gulf of Mexico brown shrimp, had a particle size of 8 mesh (2.83 mm) and smaller, was of low viscosity and was 77–83% deacetylated.

The spongy product was filtered with suction and washed with fresh 1,2-dichloroethane. It was then spread to dry in a thin layer at room temperature in a current of air. It dried superficially quite rapidly, but retained a strong odor of formic acid for some time. After further drying for several days, it became odor-free. The yield was 13.4 g of the dry, free-flowing granular chitosan complex.

The 3.4 g of formic acid complexed (0.07 mole) indicates that 1.19 moles of formic acid was complexed with each mole of chitosan. The product was readily soluble in water; the solution viscosity (1% in water) was 11.3 centipoises and the pH of a 1% solution in water was 4.5.

EXAMPLE 4

Glycolic Acid Complex

This example demonstrates the preparation of a chitosan-glycolic acid complex with a hydroxy acid containing water.

Two parts by wt. (g) of 40 mesh (0.373 mm), pharmaceutical grade high viscosity chitosan from west coast crabs, containing about 80% deacetylated acetamido groups, 3 parts by volume (ml) of 70% glycolic acid and 40 parts by volume (ml) of tetrahydrofuran were stirred together at room temperature for two hours. Thereafter the complex was filtered, washed with small amounts of tetrahydrofuran and allowed to dry. The yield was 2.2 parts by weight (g) (76%) of powdery, free-flowing product. It was almost instantly soluble in water to form a clear viscous solution. The pH of a 1% solution in water was 5.3 and its viscosity was 551 centipoises.

EXAMPLE 5

Lactic Acid Complex

This example demonstrates the preparation of a chitosan complex using a reaction liquid extract of a commercial water-containing acid.

The 15% of the water contained in 85% commercial lactic acid interfers with the facile preparation of its chitosan salt by the methods so far described. Thus, in an auxiliary step, 20 ml of 1,2-dichloroethane (DCE) and 20 ml of the 85% lactic acid were shaken vigorously for several minutes in a separatory funnel. Layers separated on standing and the lower layer, containing DCE and a portion of the lactic acid extracted from the aqueous layer, was drawn off. It amounted to 18 ml. This solution was added to 0.5 g of chitosan as described in Example 1. The mixture was allowed to stand for two hours with occasional shaking. The reaction product was filtered, washed three times with DCE, and dried in air. The free-flowing granules of product were readily soluble in water. The yield of stoiciometric product was 0.73 g or 95% of theory.

EXAMPLE 6

Acetic Acid Complex

This example demonstrates the preparation of an acetic acid complex containing an approximately one-equivalent excess over the stoichiometric amount of acetic acid. Subsequent evaporation of acetic acid from the complex provided a product containing the stoichiometric amount.

Following the general procedure of Example 2, 0.5 g ($3 \times 10^{-3}$ equiv.) of low viscosity particulate chitosan derived from brown shrimp 5 ml 1,2-dichloroethane and 1 ml ($1.7 \times 10^{-2}$ equiv.) glacial acetic acid were mixed and allowed to stand at 22° C. with occasional stirring over a period of two and one-half hours. The product was filtered and washed three times with 1,2-dichloroethane to remove excess acetic acid.

A portion of the product was removed to the bench top and its weight was followed over a period of time.

| Time (min:sec) | Sample Weight (g) |
|---|---|
| 0 | .430 |
| 2:45 | .410 |
| 6:15 | .415 |
| 12:15 | .410 |
| 24:45 | .400 |
| 41:45 | .400 |
| 55:15 | .395 |
| 56:30 | .390 |
| 67:30[1] | .390 |
| 74:00 | .370 |
| 84:15 | .360 |
| 95:45 | .350 |
| 117.15 | .350 |
| 142.15 | .345 |
| 172.30 | .340 |
| 352.30 | .310 |

[1]Sample transferred to 40° C. oven after this measurement.

Data between 12 min, 15 sec, and 67 min 10 sec (ignoring replicate weights at 24:45 and 56:30) can be shown by least squares regression to fit a straight line having a zero time intercept of 0.410 g ($r^2 = 0.9983$; slope $= -3.59 \times 10^{-4}$). This weight (0.410 g) is taken as the original weight of the complex after rapid evaporation of the 1,2-dichloroethane. The product, which was free flowing and readily soluble in water, contained more than a stoichiometric amount of acetic acid—almost exactly one mole excess, as will be demonstrated below.

From 172 min 30 sec to the end of the experiment at 352 min 30 sec, weight was lost at a slower rate (line slope $-1.67 \times 10^{-4}$). Intersection of this line and the earlier line was calculated to occur at 0.329 g and this taken as the weight of the complex containing the stoichiometric amount of acetic acid.

The difference between the two weights represents the excess of acetic acid over the stoichiometric amount. This was found to be 0.00135 moles (0.410-0.329)/60.05). As there were 0.00144 moles of chitosan (0.329/(169+60.05) present in the experiment, it is apparent that almost exactly one mole excess of acetic acid was complexed when the product was first isolated.

EXAMPLE 7

Pyruvic Acid Complex

This example illustrates the preparation of chitosan-pyruvic acid complex containing more than the stoichiometric amount of pyruvic acid.

Particulate chitosan (0.5 g) was dispersed with slow agitation in 5 ml of 1,2-dichloroethane and 1 ml of pyruvic acid was added dropwise. A voluminous product was rapidly formed. The mixture was allowed to stand at about 16° C. for 1.5 hrs. when it was filtered and washed several times with acetone. Thereafter the product was removed to the bench top and allowed to dry for an hour where it dried rapidly to yield a light tan, free-flowing granular product, readily soluble in water giving a viscous solution.

Thereafter the product was dried in a 40° C. for two hours when the weight became essentially constant. The amount of pyruvic acid in the product was estimated at 0.65 g by difference between original weight and final weight. Assuming an equivalent weight of 169 as before, the product contained 1.33 molar excess of pyruvic acid over the stoichiometric amount. The product appears to be stable under ordinary conditions.

EXAMPLE 8

Art Method; Chitosan-Propionic Acid Complex

This procedure, not of the invention, is that of Sugano et al. supra which teaches chitosan hydrochloride. The Sugano et al. procedure was unsuccessfully applied to the preparation of chitosan-propionic acid complex. The procedure as taught failed to produce product isolatable by decanting, filtering or centrifuging. Even when a modification of the procedure produced filterable product, the product was not soluble in water as are the invention products.

A sample (0.5 g) of high viscosity chitosan derived from crab was dissolved in a solution of 1 ml of propionic acid in 20 ml of water. Acetone was added dropwise to the stirred solution. Gelling began after 35 ml had been added. After 40 ml had been added, the mixture was a thick, unfiltrable, opaque gel.

Acetone was evaporated and the chitosan-propionic acid complex was made up to 30 ml with water. A 15 ml sample was added to 100 ml acetone with stirring. Product precipitated. After standing for an hour supernatant liquid was decanted. Fresh acetone was added and the mixture was allowed to stand for a further hour and filtered. After washing with acetone, the product was dried on the bench top. It was mostly horny with some fibrous material and was insoluble in water.

To the second 15 ml portion of aqueous chitosan-propionic acid mixture, a slow stream of acetone was added with stirring. Most of the product precipitated as a fine gel. After an hour, the product was filtered, redispersed in acetone, filtered, and dried on the bench top.

The product was horny with some fibrous material and was insoluble in water (water in contact with the product did not become more viscous). The product appeared to be denatured.

That which is claimed is:

1. The process for preparing a dry, free-flowing, water-soluble carboxylic acid complex of chitosan comprising the steps of
(A) combining to form a mixture;
   (1) one part by weight of particulate chitosan in which at least about 70% of all amino groups are deacetylated;
   (2) one-half to about 30 parts by weight of a liquid selected from the group consisting of alkanes containing about five to about nine carbon atoms, monoketones, monoesters, mono- and di-ethers, mononitriles, and mononitroalkanes containing two to four carbon atoms, normally liquid mono- and poly-chloroalkanes and alkenes containing one to two carbon atoms; and
   (3) from about 0.1 to about 30 equivalents of a normal or iso-monocarboxylic acid for each amino group equivalent in said chitosan, said carboxylic acid containing one to four carbon atoms and zero to one of the groups (a), (b), (c) consisting of:
(a) one to two chlorine atoms;
(b) one ketogroup;
(c) one hydroxyl group;
(4) from zero to about 30 percent by weight of water based on the weight of the carboxylic acid;
(B) maintaining said mixture until said chitosan is rendered water-soluble;
(C) recovering and drying water-soluble carboxylic acid complex of chitosan at a temperature below the denaturation temperature.

2. The process of claim 1 wherein the liquid is a dichloroalkane and the monocarboxylic acid is normal.

3. The process for preparing a dry, free-flowing, water-soluble carboxylic acid complex of chitosan comprising the steps of:
(A) Combining to form a mixture:
(1) one part by weight of particulate chitosan in which at least about 70% of all amino groups are deacetylated;
(2) from one-half part to about 30 parts by weight of a liquid selected from the group consisting of heptane, acetone, 2-butanone, ethyl formate, ethyl acetate, methylene chloride, 1,2-dichloroethane, 1,1,2-trichloroethane, trichloroethylene, perchloroethylene, 1,4-dioxane, acetonitrile, tetrahydrofuran, nitroethane, and 2-nitropropane;
(3) from one-tenth to about 30 equivalents for each equivalent of free amino group in said chitosan, of a carboxylic acid selected from the group consisting of formic, acetic, propionic, butyric, isobutyric, pyruvic, glycolic, lactic, monochloroacetic, and dichloroacetic acid; and
(4) from zero to about 30 percent by weight of water, calculated on the weight of carboxylic acid; and thereafter
(B) maintaining said mixture until said chitosan is rendered water-soluble;
(C) recovering and drying water-soluble carboxylic acid complex of chitosan at a temperature below the denaturation temperature.

4. The process of claim 2 wherein the liquid is 1,2-dichloroethane and the carboxylic acid is formic acid.

5. A dry, free-flowing, water-soluble carboxylic acid complex of chitosan prepared according to a process comprising the steps of:
(A) combining to form a mixture;
(1) one part by weight of particulate chitosan in which at least about 70% of all amino groups are deacetylated;
(2) one-half to about 30 parts by weight of a liquid selected from the group consisting of alkanes containing about five to about nine carbon atoms, monoketones, monoesters, mono- and di-ethers, mononitriles, and mononitroalkanes containing two to four carbon atoms, normally liquid mono- and poly-chloroalkanes and alkenes containing one to two carbon atoms; and
(3) from about 0.1 to about 30 equivalents of a normal or iso-monocarboxylic acid for each amino group equivalent in said chitosan, said carboxylic acid containing one to four carbon atoms and zero to one of the groups (a), (b), (c) consisting of:
(a) one to two chlorine atoms;
(b) one keto group;
(c) one hydroxyl group;
(4) from zero to about 30% percent by weight of water based on the weight of the carboxylic acid;
(B) maintaining said mixture until said chitosan is rendered water-soluble;
(C) recovering and drying said water-soluble carboxylic acid complex of chitosan at a temperature below the denaturation temperature.

6. The complex of chitosan prepared according to a process of claim 5 wherein the liquid is selected from the group consisting of: heptane, acetone, 2-butanone, ethyl formate, ethyl acetate, methylene chloride, 1,2-dichloroethane, 1,1,2-trichloroethane, trichloroethylene, perchloroethylene, 1,4 dioxane, acetonitrile, tetrahydrofurane, nitroethane, and 2-nitropropane; and wherein the carboxylic acid is selected from the group consisting of formic, acetic, propionic, butyric, isobutyric, pyruvic, glycolic, lactic, monochloroacetic, and dichloroacetic acid.

7. The complex of chitosan prepared according to a process of claim 5 wherein the liquid is a dichloroalkane and the carboxylic acid is normal.

8. The complex of chitosan prepared according to a process of claim 5 wherein the liquid is 1,2-dichloroethane and the carboxylic acid is formic acid.

* * * * *